(12) United States Patent
Campbell

(10) Patent No.: US 6,435,071 B1
(45) Date of Patent: Aug. 20, 2002

(54) VEHICLE FOR TRAVELING THROUGH HOSTILE ENVIRONMENTS

(76) Inventor: John Bruce Campbell, 26044 Carmel Knolls Dr., Carmel, CA (US) 93923

( * ) Notice: Subject to any disclaimer, the term of this patent is extended or adjusted under 35 U.S.C. 154(b) by 0 days.

(21) Appl. No.: 09/696,589

(22) Filed: Oct. 26, 2000

(51) Int. Cl.[7] .............................................. F41A 23/28
(52) U.S. Cl. ...................................... 89/36.08; 89/36.09
(58) Field of Search ............................ 89/36.08, 36.09, 89/36.13, 36.14

(56) References Cited

U.S. PATENT DOCUMENTS

| | | | |
|---|---|---|---|
| 1,975,794 A | * 10/1934 | Knox et al. ..................... 180/22 |
| 3,395,672 A | * 8/1968 | Ruf ............................ 89/36.08 |
| 4,156,536 A | * 5/1979 | Brandstadter ............... 280/705 |
| 4,158,986 A | * 6/1979 | Appelblatt et al. ......... 89/36.08 |
| 4,677,896 A | * 7/1987 | Litvinoff .................... 89/36.08 |
| 5,915,292 A | * 6/1999 | Abels ........................ 89/36.08 |

FOREIGN PATENT DOCUMENTS

DE     2235726    * 1/1974   ............... 89/36.08

* cited by examiner

*Primary Examiner*—Stephen M. Johnson
(74) *Attorney, Agent, or Firm*—Drummond & Duckworth

(57) ABSTRACT

An inexpensive, highly maneuverable vehicle is provided for operating within the proximity of landmines. The vehicle is preferably hydrostatically propelled and includes an adjustable hydraulic suspension for providing a varying ground clearance depending on terrain and operation. The vehicle includes "bendaway" or "breakaway" wheels and a smooth underside. The hydrostatic drive system and bendaway or breakaway wheels provide a vehicle which can still maneuver even with one or two wheels disengaged due to removal upon striking a landmine. In a preferred embodiment, the vehicle is constructed to operate as a battlefield ambulance. The vehicle includes a portal formed on the vehicle's underside for permitting the retrieval of injured persons to within the vehicle without subjecting occupants within the vehicle to be vulnerable to hostile fire.

4 Claims, 5 Drawing Sheets

VEHICLE FOR TRAVELING THROUGH HOSTILE ENVIRONMENTS

BACKGROUND OF THE INVENTION

The present invention relates to vehicles constructed to travel in militarily hostile environments. More particularly, the present invention relates to vehicles intended to operate in the vicinity of minefields.

Few vehicles are constructed to withstand the destructive forces of landmines which can be encountered in combat regions during and after hostilities. For example, extremely heavy and expensive tanks have been constructed, such as the United States' M1 Abrams tank which attempts to withstand landmine blasts by constructing the vehicle with several inches of steel armor. Unfortunately, such vehicles are extremely large, heavy and lack maneuverability and thus are not suited for many geographical locations. The vehicles are also extremely expensive and thus are not economically feasible for many combat functions. Moreover, even though such heavy tanks are constructed to withstand and operate after encountering antipersonnel landmines which are designed to incapacitate humans but not vehicles, heavy tanks cannot typically withstand the direct blast of an antitank landmine. After encountering such a landmine, a tank will typically protect its occupants but lose a track, resulting in the tank being completely immobile. Where the tank is in combat, any occupants within the tank are at great risk as it is impossible for them to flee from the combat location while the tank is immobilized.

Smaller combat vehicles such as the HUMVEE cannot even withstand the blast from an antipersonnel landmine. Smaller combat vehicles are typically not provided with metal tracks or thick armor and become immobilized upon impacting either an antitank landmine or an antipersonnel landmine. Again, if this occurs in a combat setting, occupants with the vehicle become a stationary target more easily killed during enemy fire. Anecdotally, military personnel have expressed reluctance to enter into some military vehicles during combat due to their reputation for becoming immobile and dangerously vulnerable after a vehicle's wheel encounters a landmine or other ordnance.

The global landmine crisis has also created a hostile environment even though military combat may no longer exist in a particular region. It is estimated that there are between 60 and 70 million landmines deployed in the ground located in more than 70 countries. At present, the United Nations estimates that landmines kill 24,000 people and injure approximately 450,000 people every year, including a high percentage of children. Landmines not only kill and disable individuals but they impede long term reconstruction of war torn regions. Not only are minefields uninhabitable, but they cannot be cultivated or put to productive use because local populations are threatened by the actual and perceived presence of landmines. Unfortunately, local personnel are often enticed into minefields due to the need to cultivate food.

In recent years, the international community has attempted to address the global landmine crisis. The United Nations is coordinating a global effort to survey the state of landmine contamination in landmine affected countries, and private and public groups are undertaking landmine clearance efforts to rid regions of the landmine problem. Unfortunately, it costs only $3.00 to deploy an antipersonnel landmine but approximately $300.00 to remove one. Moreover, landmine clearance is an extremely dangerous profession and it is estimated that more than 80 deminers died in the country of Kuwait after the Gulf War alone.

Unfortunately, there are no inexpensive, mobile vehicles which are suited for operating in vicinity of a minefield. Large tanks are too expensive for many minefield military operations or for demining operations. Meanwhile, smaller and more maneuverable combat vehicles typically do not provide the vehicles' occupants with the protection to operate in proximity to minefields. Moreover, present vehicles do not provide mobility after they have struck a landmine, leaving the vehicles' occupants vulnerable to enemy fire or left to walk across an open minefield.

There is thus a definite need for a vehicle which can transport personnel in proximity to a minefield. Moreover, there is a need for a vehicle which can still move once it has struck a landmine.

It would be preferable if the vehicle were mobile and versatile so that it may operate both as a military combat vehicle, a demining vehicle and as a military ambulance. It would also be preferable that the vehicle were reliable and inexpensive to manufacture.

SUMMARY OF THE INVENTION

The present invention addresses the aforementioned disadvantages by providing an improved vehicle for traveling through hostile environments. More particularly, the vehicle includes four or more wheels and is constructed to move even if one or two wheels have been disabled, such as being blown off by a landmine or ordnance. Thus, the vehicle of the present invention is ideally suited for operation within the vicinity of a minefield during military combat or demining operations. If one of the wheels encounters a landmine, the wheel assembly is constructed to absorb the forces imparted by the landmine causing the wheel assembly to bend upwardly, or preferably to disengage from the vehicle. As will be explained in greater detail below, the vehicle is constructed to maintain mobility so that if the vehicle strikes a landmine, those within the vehicle can still drive the vehicle to safety.

In a preferred embodiment, the vehicle is hydraulically driven including at least one engine and at least one hydraulic pump for pumping hydraulic fluid to hydraulic motors located at each wheel. The front and rear wheels are non-steerable and driven by separate reversible hydraulic motors. The steering of the vehicle is accomplished by operating driver located hand levers, foot pedals or a steering wheel to controllably direct hydraulic fluid from the hydraulic pump to the hydraulic motors to selectably control the rotational velocity of the wheels on each side of the vehicle. An increase in rotational velocity of wheels on one side of the vehicle relative to the rotational velocity on the other side of the vehicle cause the vehicle to turn in the opposite direction. In fact, the vehicle can rotate within the length of its wheel base by causing the left wheels to rotate at the same speed in the opposite direction as the right wheels of the vehicle.

Vehicle braking is also provided utilizing the hydraulic system. Breaks prone to wear are thereby eliminated.

Preferably, the suspension system is also hydraulic and controllable. The suspension system includes a hydraulic actuator at each of the wheels which support the mass of the vehicle relative to the wheel assemblies. By controllably directing fluid to each of the actuators, the ground clearance of the vehicle can be varied for different road conditions. Moreover, added fluid can be sent to the actuators where the vehicle is carrying additional weight.

Of importance, the vehicle of the present invention is constructed to be capable of movement even if the vehicle encounters a landmine resulting in one or two wheels being blown off. To this end, the suspension system preferably includes control arms at each wheel which extend the wheels laterally away from the chassis and body of the vehicle. Preferably, the control arm are constructed to position the centerline of the wheels at least a twelve (12) inches away from the chassis of the vehicle. Even more preferably, the length of the control arms cause the centerline of the wheels to be positioned at least eighteen (18) to thirty-six (36) inches from the chassis. This is contrary to the constructions of typical suspension systems of military vehicles wherein the centerline of the wheels is positioned within the chassis, or at least as close to the frame as possible to minimize the vehicles profile. However, the vehicle of the present invention moves the wheels away from the vehicle's chassis in an effort to localize the effects of a wheel striking a landmine as far from the vehicle chassis as possible. Thus, upon the vehicle's wheel striking a landmine, the forces of the explosion are primarily absorbed by the suspension control arm causing the control arm to bend, or preferably, to "breakaway" from the vehicle.

Projecting through the control arm from each wheel's hydraulic motor is an axle which connects to the respective wheel. Activation of the hydraulic motor causes the axle to rotate its corresponding wheel. To provide "breakaway" wheels, in a preferred embodiment, the suspension system and axle include a plurality of shear pins which are constructed to shear at specific shear loads. The shear pins connect the vehicle's frame to the suspension control arms, and connect the hydraulic motors to their corresponding drive axles so that upon the vehicle's wheel encountering a substantial force, such as one exerted by encountering a landmine, the shear pins are constructed to shear causing the wheel assembly, axle and control arms to disengage from the vehicle.

The vehicle is also provided with a skid plate on the bottom of the vehicle, or with a substantially smooth or unencumbered underside. Upon disengagement of a wheel assembly from the vehicle, the vehicle does not have any sharp edges where the wheel assembly has been removed which would significantly impair the ability of the remaining three wheels to move the vehicle.

In a preferred embodiment, the vehicle is also ideally constructed to function as a combat ambulance. To this end, the vehicle includes a portal and doors on the vehicle's underside so as to permit objects to pass through the door from the outside of the vehicle to within the vehicle's interior. To retrieve an injured soldier from a combat environment, the vehicle adjusts its suspension so that it has sufficient ground clearance so as to drive directly over a person when the person is lying in the prone position. The vehicle then drives over the person with the bottom doors of the vehicle open. The person can then be pulled to within the interior of the vehicle without persons within the vehicle being vulnerable to hostile fire.

Other features and advantages of the present invention will be appreciated by those skilled in the art upon reading the detailed description which follows with reference to the attached drawings.

DETAILED DESCRIPTION OF THE INVENTION

Figure 1:
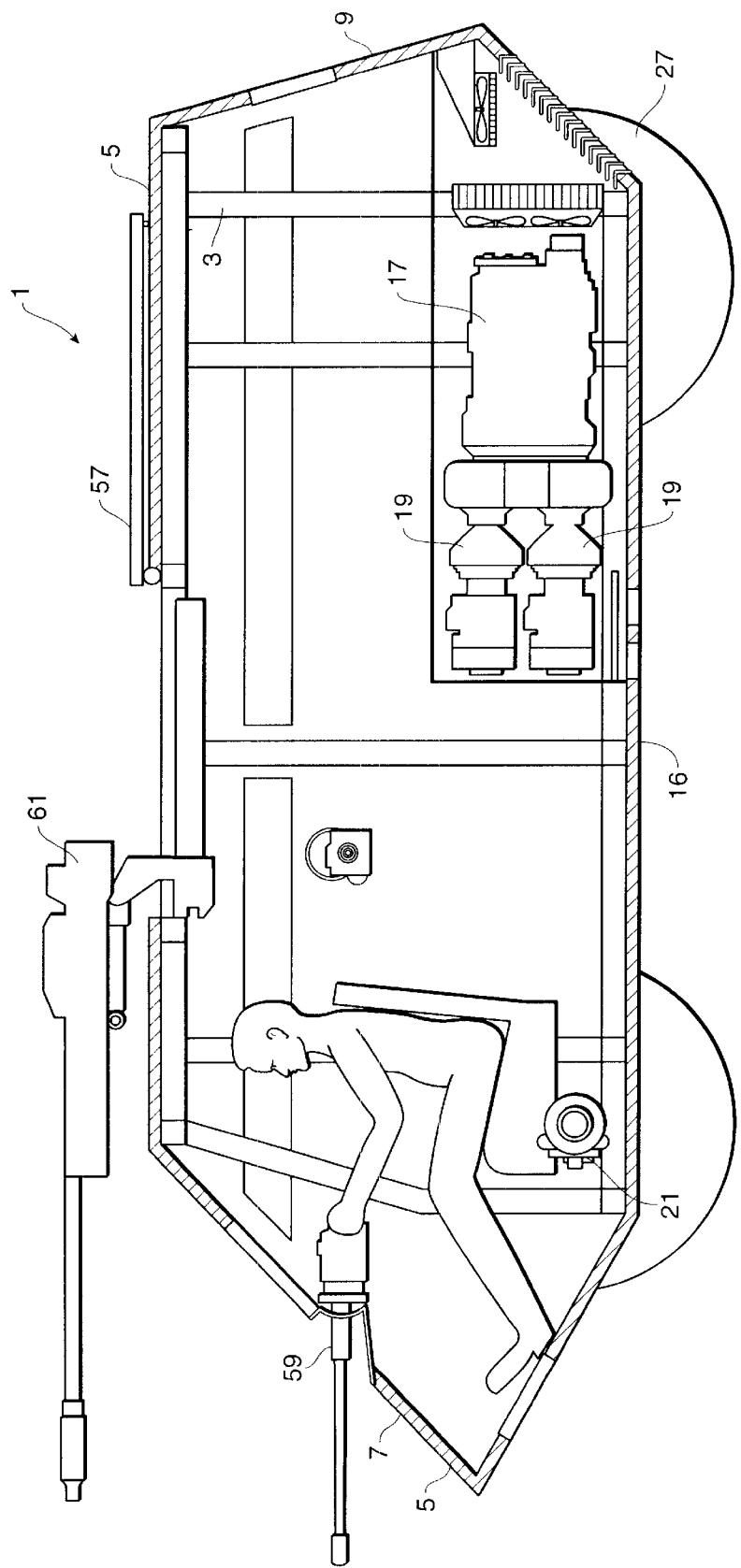
FIG. 1 is a side cutaway view of the vehicle of the present invention.

While the present invention is susceptible of embodiment in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

Figure 2:
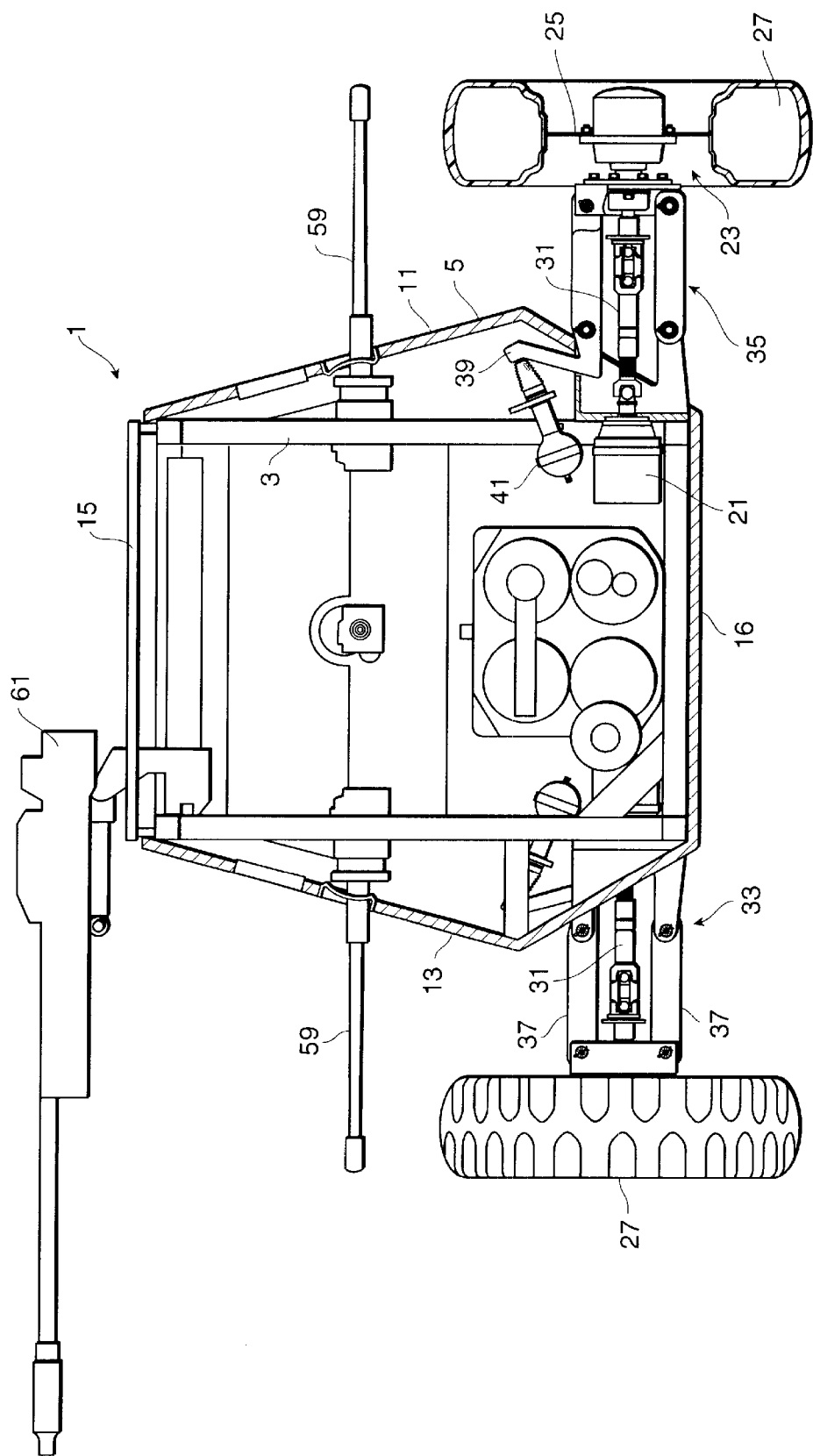
FIG. 2 is a front cutaway view of the vehicle of the present invention.

With reference to FIGS. 1 and 2, the vehicle 1 of the present invention includes a frame chassis 3 which is preferably constructed of a metal such as steel or aluminum. Mounted to the chassis 3 are body panels including a front panel 7, rear panel 9, left panel 11, right panel 13 and top panel 15. To save weight, preferably the body panels are constructed of composite materials such as fiberglass and/or kevlar armor which minimize burning and smoke asphyxiation, and prevent spalling which occurs when pieces of metal armor turn into projectiles, when struck by enemy fire. The use of composite materials also reduces the vehicle's tendency to trigger the detonation of magnetic triggered mines.

Figure 5:
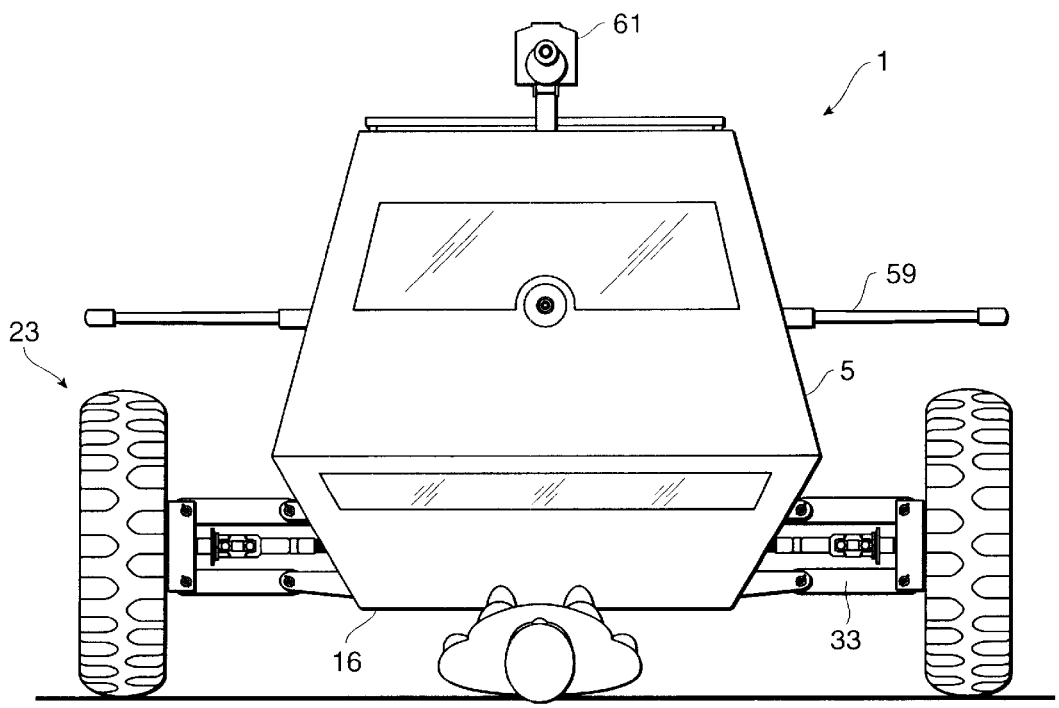
FIG. 5 is a front view illustrating the vehicle of the present invention approaching a person lying in the prone position.
Figure 6:
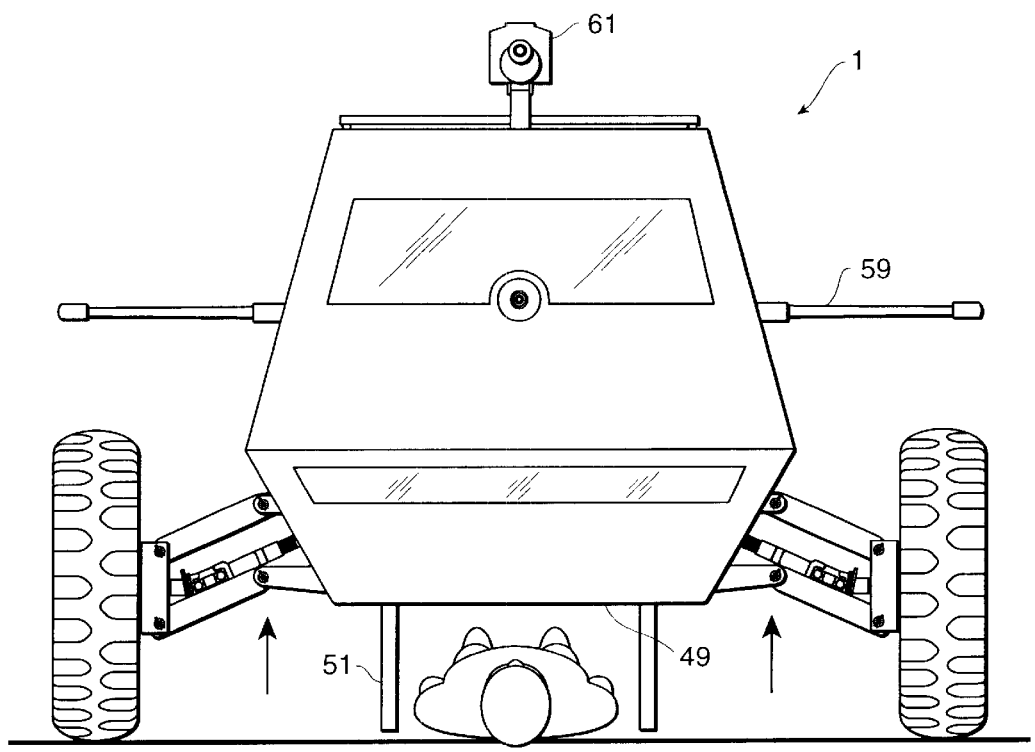
FIG. 6 is a front view illustrating the vehicle of the present invention with its bottom doors open so as to bring a person to within the interior of the vehicle.

With reference also to FIGS. 5 and 6, the vehicle 1 also includes a bottom panel 16 which is preferably reinforced with extra layers of fiberglass or kevlar or even with steel to withstand an explosion caused by a landmine detonating directly below the vehicle 1. Preferably, formed in the bottom panel 16 is a portal 49 having doors 51 for permitting objects to enter and exit the interior of the vehicle 1.

As shown in FIGS. 1–4, a preferred vehicle 1 of the present invention includes four wheels 25, though the vehicle 1 may also be constructed with more wheels for carrying larger loads without departing from the spirit and scope of the invention. The wheels 25 are preferably driven by a hydrostatic drive system including an internal combustion engine. The hydrostatic drive system also includes at least one hydraulic pump 19 connected to the engines 17 for supplying high pressure hydraulic fluid through hydraulic lines 20 to four hydraulic motors 21 located at each of the four wheels 25. The motors are preferably drivable in both the forward and reverse directions and provide varying rotational velocity depending on the varying hydraulic displacement provided by the hydraulic pumps 19. The hydrostatic system is preferably controlled by actuating members (not shown) such as levers, pedals, wheels, etc. which are connected to a plurality of valves 55 for controlling the flow of hydraulic fluid through the hydraulic lines 20.

Figure 3:
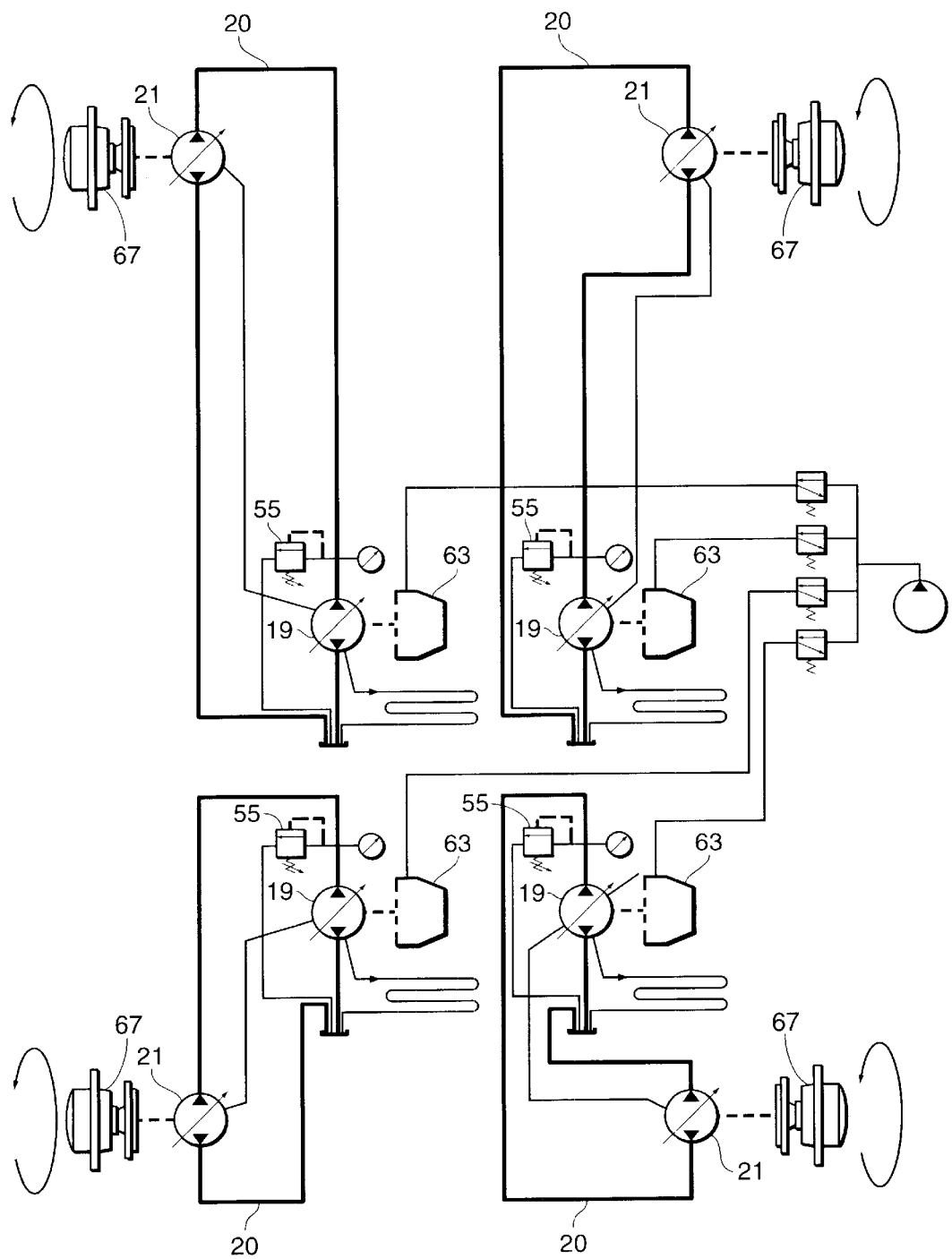
FIG. 3 is a schematic view illustrating the hydrostatic drive system of the vehicle of the present invention.

In a preferred embodiment, the hydrostatic drive system preferably includes two internal combustion engines 17 to provide redundancy. Acceptable engines include Moller™ turbo charged rotary air cooled engines which produce approximately 150 horsepowers each but weigh only 74 pounds. As shown in FIG. 3, a preferred vehicle 1 includes four hydraulic pumps 19 which are connected to the engines 17 and individually controlled and regulated by four clutch/transmission assemblies 63. The pumps 19, in turn, provide hydraulic fluid under pressure through hydraulic lines 20 to the motors 21. The rotation of the motors is then transmitted to the wheels 25 through planetary gears 67. Preferably, the hydrostatic drive system also includes one or more hydraulic valves (not shown) which are located near each wheel assembly which close manually or automatically if a hydraulic line 20 ruptures. Thus, if a hydraulic line ruptures, such as by a vehicle wheel striking a landmine, hydraulic lines are closed to maintain sealed integrity of the hydrostatic drive system to permit continued controllable rotation of the remaining drive wheels.

Preferably, breaking is also accomplished through the hydrostatic system. To this end, the hydrostatic system includes an additional flow line which is connected to the hydraulic motor 21 at each wheel 25 for producing an inhibiting effect on the drive motor via an increased motor drag. In the alternative, each wheel 25 may also include an additional motor to which hydraulic fluid is routed during breaking to inhibit rotation of the wheels 25.

Referring to FIGS. 2 and 3, the vehicle 1 also includes a hydraulic suspension. As shown, the hydraulic suspension includes a control arm 35 at each wheel 25 including upper and lower linkages 37. Preferably, the control arms 35 are constructed to position the centerline of the wheels at least a twelve (12) inches away from the chassis of the vehicle. Even more preferably, the length of the control arms cause the centerline of the wheels 25 to be located at least eighteen (18) to thirty-six (36) inches from the chassis. Passing through the control arm linkages 37 is an axle 31 which is connected directly to a hydraulic motor 21 by a universal joint 45 and to a wheel bearing assembly 26 which comprises the outer extremity of the control arm 35. Attached to each wheel bearing assembly 26 is a wheel 25 and tire 27.

The control arms 35 are rotationally connected about the horizontal axis to the chassis 3 through shear pins 43. The suspension system further includes a hydraulic actuator 41 at each wheel assembly 23 which controllably rotate each control arms 35 by controllably imparting force upon a lever arm 39 which extends upwardly from the inner extremity of the control arm's upper linkage 37. The hydraulic actuator 41 is connected to hydraulic pumps which are controlled by valves to controllably force hydraulic fluid to and from the hydraulic actuators 41. An increase of hydraulic fluid to the hydraulic actuator 41 causes the actuator to extend thereby forcing the control arms 35 to rotate downwardly which support the sprung mass of the vehicle 1 relative to the wheel and hub assemblies. In operation, control of the hydraulic fluid to the actuators can be used to vary the ground clearance of the vehicle 1 for traveling in different terrain. For example, the ground clearance of the vehicle 1 can be reduced when traveling within urban environments or on well kept roads. In the alternative, the hydraulic pressure to the hydraulic actuators 41 can be increased to increase the ground clearance when traveling in off-road conditions.

Figure 4:
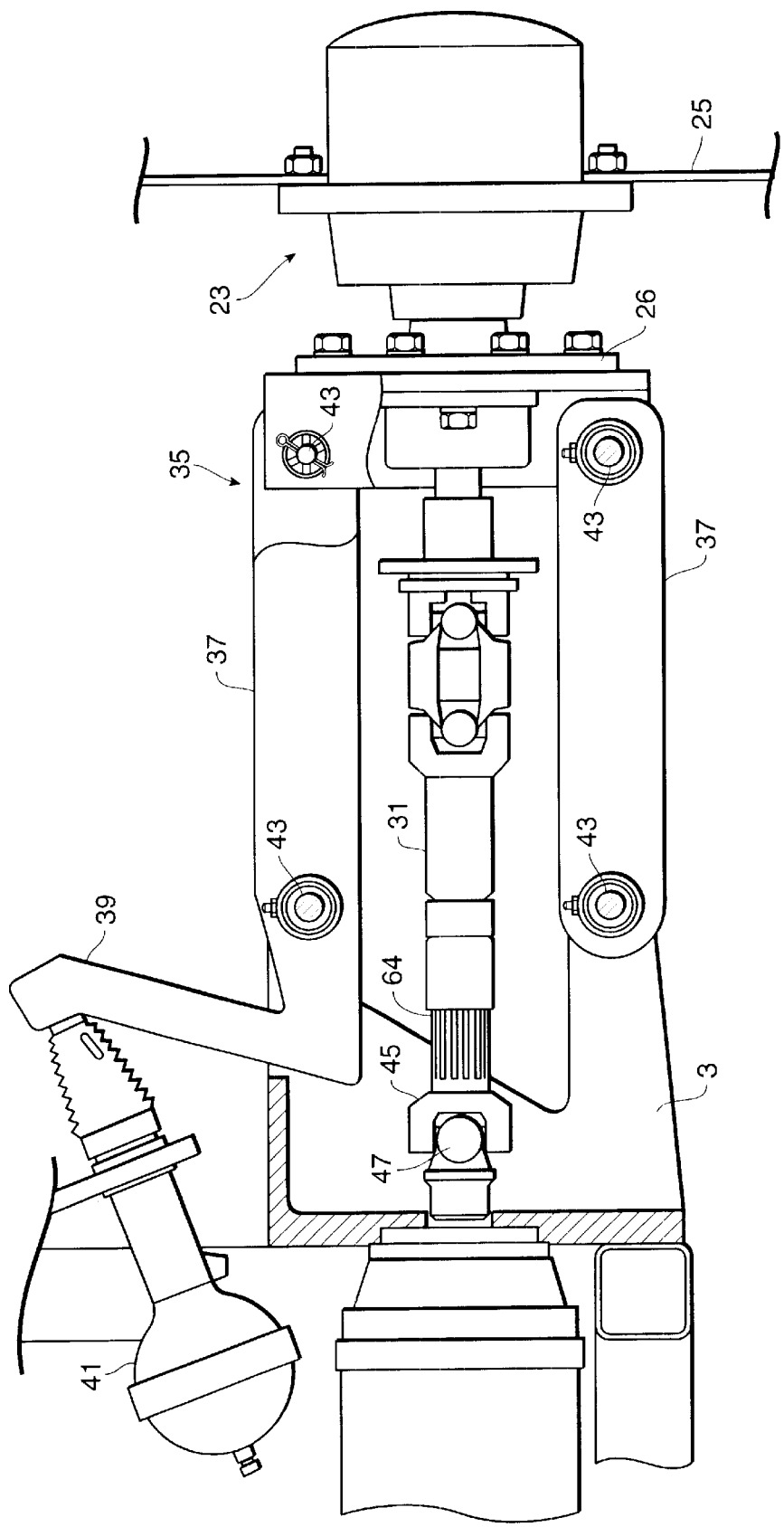
FIG. 4 is a front view of a wheel assembly and suspension system of the vehicle of the present invention.

Of importance, the control arms of the suspension system provide for "bendaway", or preferably "breakaway" wheels in the event that a tire detonates a landmine. To this end, the control arms are sufficiently long that they will absorb the forces imparted by the detonation of a landmine by bending upwardly. Since the wheels are positioned away from the vehicle chassis, any significant bending of the control arms will not damage the chassis or body of the vehicle. More preferably, the vehicle control arms are attached to the vehicle chassis in a manner which allows for a clean separation with no significant tearing or twisting damage to the suspension parts in the event that a tire detonates a landmine. For this embodiment, each wheel assembly is designed to shear, break or fracture away from the vehicle in the event that the wheel assembly encounters an impulse force greater than typically encountered during rough driving, such as would be encountered upon striking a landmine. As shown in FIG. 4, shear pins 43 for withstanding definite and predetermined shear loads are used to connect the control arms 35 to the chassis 3. The shear pins are designed to act as the weak point and to break in the event that a wheel 25 strikes and detonates a landmine. Moreover, the axles 31 are preferably attached to a universal joint 45 by a telescopic attachment 64 which permits the axles to engage and disengage from the universal joint without significant force.

As would be understood and can be determined by those skilled in the art without undo experimentation, the shear limit of the shear pins will vary greatly depending on the weight of the vehicle 1, the terrain in which the vehicle 1 is intended to be driven, and the detonation forces of the landmines that the vehicle 1 is expected to encounter. However, after encountering a landmine, the entire wheel assembly 23, control arm 35 and axle 31 are intended to be disengaged from the vehicle 1 so that at the vehicle's corner where a wheel assembly 23 has been removed, the vehicle 1 will rest on a substantially smooth surface. For this reason, the vehicle 1 is provided with a relatively unencumbered underside or with a skid plate. Because the hydrostatic drive system will continue to provide controllable rotation of the vehicle's remaining wheels 25, the vehicle 1 can be driven away and steered even if one or even two wheel assemblies 23 have been removed due to the explosion of ordnance or landmines.

Moreover, the hydrostatic drive system preferably includes automatic or manual shutoff valves between the engine and each pump and/or between pump and each motor for selectively closing a hydraulic line in the event that there is a leak in the hydraulic system. Thus, in the event that the detonation of a landmine ruptures a hydraulic line 20, the hydraulic line 20 can be isolated from the rest of the hydrostatic drive system so that system can continue to rotate wheels not affected.

The vehicle 1 of the present invention is thus ideally suited for operating in proximity to minefields. For combat operations, the vehicle 1 can be constructed with three 7.62 mm NATO chain machine guns 59 located in the front and sides of the vehicle 1. For combat operations, preferably the vehicle 1 is also outfitted with a 30 mm gun 61 mounted on the vehicle's upper extremity which is accessible by an upper hatch 57.

As shown in FIGS. 5 and 6, the vehicle 1 can also be constructed to function as a battlefield ambulance. When utilized as an ambulance, the portal 49 formed on the vehicle's underside is used to access injured soldiers and to withdraw the injured soldiers to within the vehicle 1. Upon approaching an injured soldier, the hydraulic suspension system is controlled to increase the ground clearance of the vehicle 1 and doors 51 are opened so that the vehicle can drive over a person lying in the prone position without being struck by the vehicle. Open doors 51 are then be positioned on each side of the person to provide protection against enemy fire as the person is being worked on by paramedic personnel or being retrieved into the interior of the vehicle 1. Due to its adjustable hydraulic suspension, the vehicle 1 can even be lowered down over the injured person to assist in the injured person's retrieval and to provide additional protection during retrieval.

Although the present invention has been described with reference to the preferred embodiments, workers skilled in the art will recognize that changes may be made in form and detail without departing from the spirit and scope of the invention.

Having identified the present preferred embodiments thereof, I claim:

1. A vehicle comprising:

a plurality of ground engaging wheels for propelling the vehicle;

a load support chassis supported over the ground by said wheels;

a body including a front panel attached to the front of said chassis, a left panel attached to the left side of said chassis, a right panel attached to the right side of said chassis, a rear panel attached to the rear of said chassis and a bottom panel attached to the bottom of said chassis;

an openable and closeable portal formed in said bottom panel for allowing objects to be passed from the exterior of said vehicle to the interior of said body; and an operator adjustable suspension system connecting said wheels to said chassis for controlling the ground clearance between said body and the ground, said suspension system adjustable by an operator of the vehicle to vary the ground clearance between said body and the ground.

2. The vehicle of claim 1 wherein said portal is sufficiently large for a human to pass through.

3. A vehicle for operating in mine fields comprising:

a plurality of ground engaging drive wheels;

a load support chassis supported over the ground by said wheels;

a drive system connected to said drive wheels by a plurality of axles for rotating said drive wheels, said drive system including at least one hydraulic pump and a plurality of hydraulic motors, said hydraulic pump hydraulically connected to said hydraulic motors with said hydraulic motor mechanically connected to said axles to rotate said drive wheels;

a suspension system connecting said wheels to said chassis;

said suspension system and each of said axles constructed to shear or fracture between said drive wheels and said hydraulic motors, causing a drive wheel to be disengaged from the vehicle without damage to said hydraulic motor, upon a predetermined force being imparted upon a drive wheel;

said drive system capable of rotating the remainder of said drive wheels permitting movement of the vehicle if a drive wheel is disengaged from the vehicle.

4. The vehicle of claim 3 wherein said suspension system is connected to said chassis and said axles are connected to said drive system through a plurality of shear pins.

* * * * *